(12) United States Patent
Houston

(10) Patent No.: US 10,605,613 B2
(45) Date of Patent: Mar. 31, 2020

(54) SYSTEM AND METHOD FOR FACILITATING LOCATION OF DRIVER-PARTICIPANTS OF CAR TRANSPORTATION SYSTEMS

(71) Applicant: Scott Houston, Las Vegas, NV (US)

(72) Inventor: Scott Houston, Las Vegas, NV (US)

(*) Notice: Subject to any disclaimer, the term of this patent is extended or adjusted under 35 U.S.C. 154(b) by 155 days.

(21) Appl. No.: 15/692,119

(22) Filed: Aug. 31, 2017

(65) Prior Publication Data

US 2018/0058866 A1 Mar. 1, 2018

Related U.S. Application Data

(60) Provisional application No. 62/381,779, filed on Aug. 31, 2016.

(51) Int. Cl.
| | |
|---|---|
| *G01C 21/34* | (2006.01) |
| *G08G 1/13* | (2006.01) |
| *G01C 21/36* | (2006.01) |
| *G01C 21/20* | (2006.01) |
| *G08G 1/005* | (2006.01) |
| *G06Q 50/30* | (2012.01) |

(52) U.S. Cl.
CPC ......... *G01C 21/3438* (2013.01); *G01C 21/20* (2013.01); *G01C 21/367* (2013.01); *G08G 1/005* (2013.01); *G08G 1/13* (2013.01); *G06Q 50/30* (2013.01)

(58) Field of Classification Search
CPC .. G01C 21/20; G01C 21/3438; G01C 21/367; G06Q 50/30; G08G 1/005; G08G 1/13

USPC ......................................................... 701/428
See application file for complete search history.

(56) References Cited

U.S. PATENT DOCUMENTS

| | | | | |
|---|---|---|---|---|
| 5,448,479 | A * | 9/1995 | Kemner | B62D 1/28 180/167 |
| 7,062,376 | B2 | 6/2006 | Oesterling | |
| 7,136,747 | B2 | 11/2006 | Raney | |
| 8,174,447 | B2 * | 5/2012 | Loidl | G01S 5/0252 342/451 |
| 10,049,505 | B1 * | 8/2018 | Harvey | G07C 5/008 |
| 10,088,846 | B2 * | 10/2018 | Gao | G06F 3/017 |
| 2004/0049424 | A1 | 3/2004 | Murray et al. | |

(Continued)

*Primary Examiner* — Angelina Shudy
(74) *Attorney, Agent, or Firm* — Boudwin Intellectual Property; Daniel Boudwin

(57) ABSTRACT

A system and method for facilitating location of driver-participants in car transportation systems is provided. The system includes a network-independent signal emitting device and an electronic device, each in communication with a car transportation system. The signal emitting device corresponds to a driver-participant of the car transportation system while the electronic device corresponds to a passenger-participant of the car transportation system. The signal emitting device is configured to transmit a signal including location data. The signal includes a unique identifier that associates the signal emitting device with the driver-participant of the car transportation system. The electronic device is configured to receive the signal and display the driver-participant's location. A logic is configured to recognize the unique identifier transmitted by the signal emitting device, ascertain the location of the signal emitting device based on the location data transmitted by the signal, and direct the passenger-participant to that location.

11 Claims, 4 Drawing Sheets

(56) References Cited

U.S. PATENT DOCUMENTS

| | | | |
|---|---|---|---|
| 2008/0294340 A1* | 11/2008 | Schmidt | G01C 21/3661 |
| | | | 701/469 |
| 2014/0180575 A1* | 6/2014 | Lin | G08G 1/123 |
| | | | 701/465 |
| 2014/0207375 A1 | 7/2014 | Lerenc | |
| 2014/0240088 A1* | 8/2014 | Robinette | G08B 13/1427 |
| | | | 340/5.61 |
| 2014/0336920 A1* | 11/2014 | Burrell | G01C 21/206 |
| | | | 701/409 |
| 2014/0378118 A1 | 12/2014 | Mohebbi et al. | |
| 2016/0078758 A1* | 3/2016 | Basalamah | G08G 1/0112 |
| | | | 701/118 |
| 2016/0161266 A1* | 6/2016 | Crawford | G01C 21/34 |
| | | | 701/25 |
| 2016/0216130 A1* | 7/2016 | Abramson | G01C 21/3626 |
| 2017/0115129 A1* | 4/2017 | Lee | A61B 5/486 |
| 2017/0249846 A1* | 8/2017 | Ignaczak | B64C 39/024 |
| 2018/0053112 A1* | 2/2018 | Bravyi | G06N 10/00 |
| 2019/0043001 A1* | 2/2019 | Woulfe | G01C 21/3438 |

* cited by examiner

SYSTEM AND METHOD FOR FACILITATING LOCATION OF DRIVER-PARTICIPANTS OF CAR TRANSPORTATION SYSTEMS

CROSS REFERENCE TO RELATED APPLICATIONS

This application claims the benefit of U.S. Provisional Application No. 62/381,779 filed on Aug. 31, 2016. The above identified patent application is herein incorporated by reference in its entirety to provide continuity of disclosure.

BACKGROUND OF THE INVENTION

The present invention relates to mobile car transportation systems. More specifically, the present invention relates to a system and method that facilitates the location of driver-participants of car transportation systems by providing a driver-locating means using a network-independent signal emitting device and a passenger-to-driver navigation platform that directs a passenger-participant to the location of the signal emitting device.

Individuals often utilize car transportation systems and networks, such as Uber and Lyft, to obtain rides to desired destinations. These car transportation systems utilize networks to automatically match drivers and passengers based on various criteria, such as route, availability, and location. Once a passenger requests a ride, the car transportation system assigns a driver to the passenger, notifies the driver of the passenger's pick-up location, and notifies the passenger of an estimated time of arrival. Often times a passenger requests a ride inside of a large commercial area, so the car transportations system, employing its global positioning system (GPS), automatically sets a pick-up location based on a proximate physical address that is not necessarily the exact location in which the passenger wishes to be picked up. This automatic GPS-determined pick-up location setting is a flaw in the car transportation system, because passengers do not always request rides exactly where they want to be picked up, and thus end up waiting for drivers at a location different than where the driver ends up going to pick up the passenger. Additionally, it is often the case in busy commercial areas, such as hotels, airports, stadiums, and highly populated urban areas, that drivers are unable to drive exactly to the pick-up location, either because the commercial area does not allow it, or because it is simply an area in which a vehicle may not access.

In order to overcome these problems, car transportations systems typically provide interfaces, wherein the driver and passengers can call or text each other to provide updates regarding their status, or changes in pick-up locations. However, having to manually check on the status of other participants by calling or texting is inconvenient and time consuming. Not only that, but repeatedly calling or texting to send or receive status updates has been perceived as disruptive and annoying. Additionally, drivers may be prohibited from texting while driving or talking on the phone without a hands-free communication device. Furthermore, depending on the commercial area in which the car transportation system participants are located, network signals may be bad or jammed, thereby not allowing the participants to communicate with each other.

Therefore, issues arise when passenger-participants request a ride in commercial areas because drivers may simply be unable to get to a scheduled pick-up location and unable to advise their passengers of their whereabouts, and because drivers are frequently ticketed due to illegal standing or parking in unauthorized areas while waiting for passengers to locate them. Ultimately, these issues cause delays in pick-up times, driver and passenger frustration, and overall poor customer satisfaction.

Therefore, there is a need for system and method for facilitating the location of driver-participants of car transportation systems by employing a driver-locating means using a network-independent signal emitting device and a passenger-to-driver navigation platform that directs a passenger-participant to the signal emitting device.

SUMMARY OF THE INVENTION

In view of the foregoing disadvantages inherent in the known types of car transportation systems now present in the prior art, the present invention provides a system and method for facilitating the location of driver-participants of car transportation systems wherein the same can be utilized for providing convenience for the user when employing car transportation systems.

In one embodiment of the preset invention, the system and method comprises a signal emitting device and an electronic device, each in communication with a car transportation system. The signal emitting device corresponds to a vehicle of a driver-participant of the car transportation system and is configured to transmit a signal to an electronic device that corresponds to a passenger-participant of the car transportation system. The signal includes a unique identifier for identifying the signal emitting device. The signal-emitting device includes a first processor, a first memory, and a first logic configured to transmit a number corresponding to the unique identifier of the signal emitting device to the electronic device, retrieve location data of the signal emitting device, and transmit the location data of the signal emitting device to the electronic device.

The electronic device includes a graphic user interface, a wireless transceiver configured to receive the signal, a second processor, a second memory in operative communication with the second processor, and a second logic configured to store the number corresponding to the unique identifier in the second memory, retrieve the number from second memory upon the wireless transceiver receiving the signal from the signal emitting device, and match the retrieved number with the unique identifier transmitted with the received signal. If there is no match, then the logic does not recognize the signal emitting device. If there is a match, then the logic recognizes the signal emitting device and ascertains the location of the signal emitting device based on the location data transmitted therewith. The logic is further configured to provide navigation directions towards the signal emitting device via the graphic user interface of the electronic device.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
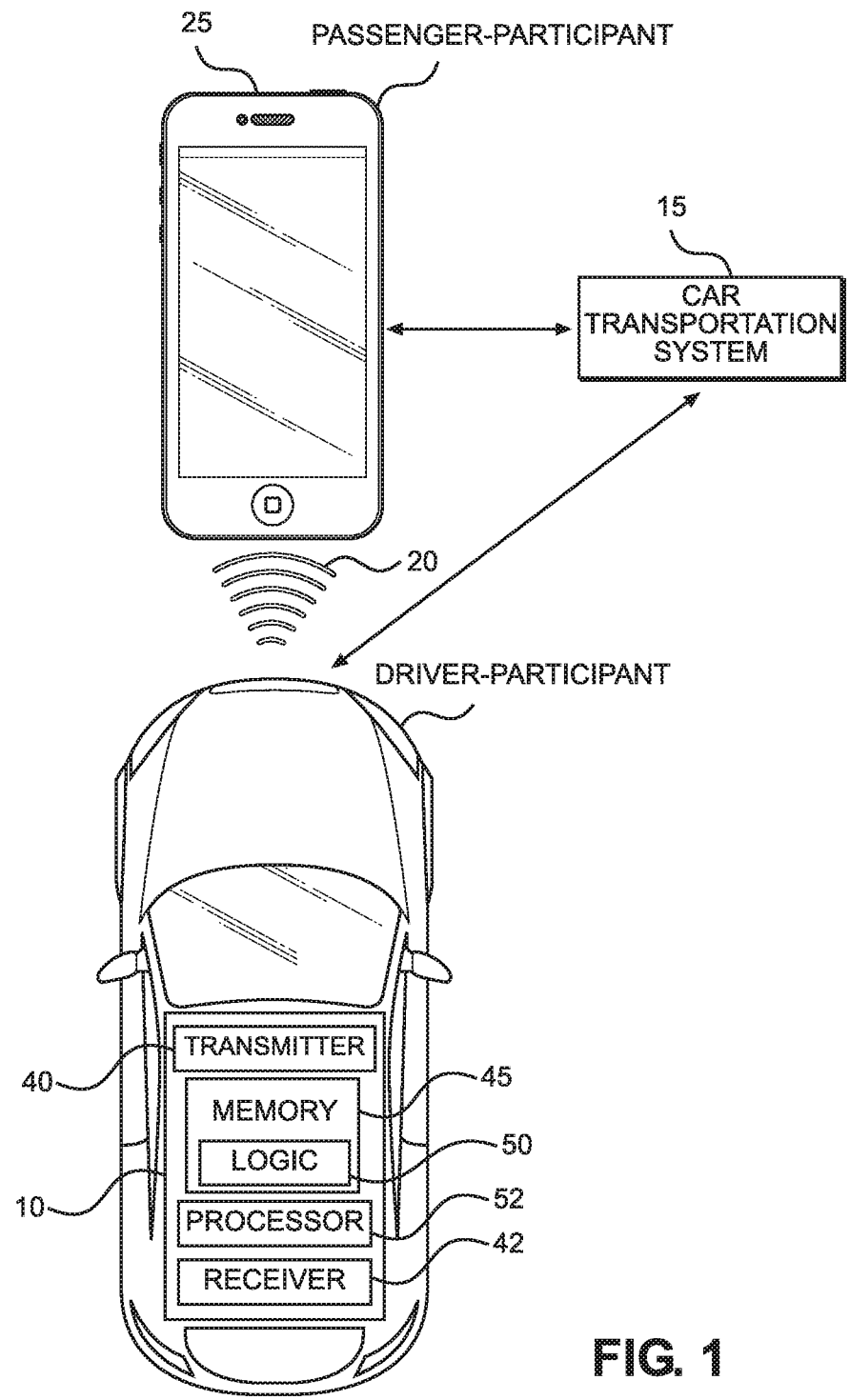
FIG. 1 shows a diagram by which the system operates to facilitate location of driver-participants of car transportation systems according to one embodiment of the present invention.

Reference is made herein to the attached drawings. Like reference numerals are used throughout the drawings to depict like or similar elements of the system and method for facilitating location of driver-participants of car transportation systems. The figures are intended for representative purposes only and should not be considered to be limiting in any respect.

As used herein, "logic" refers to (i) logic implemented as computer instructions and/or data within one or more computer processes and/or (ii) logic implemented in electronic circuitry. In the interests of economy, the present disclosure refers to "a logic," "a processor," and so on. However, this should not be read as limiting in any way as the present disclosure contemplates embodiments of the present invention utilizing "one or more logic," "one or more processors," and so on. Unless specifically limited to a single unit, "a" is intended to be equivalent to "one or more" throughout the present disclosure.

Referring now to FIG. 1, there is shown a diagram by which the system operates to facilitate location of driver-participants of car transportation systems. The present invention provides a system and method for aiding passenger-participants of car transportation systems in locating driver-participants of car transportation systems, particularly in commercial areas. The system includes a signal emitting device 10 and an electronic device 25 in communication with a car transportation system 15, such as Uber or Lyft. The signal emitting device 10 is configured to transmit a signal 20 including location data and a unique identifier that identifies the location of a driver-participant of the car transportation system 15. The electronic device 25 is configured to receive the signal 20 and display the driver-participant's location. A logic 70 of the electronic device 25 is configured to recognize the unique identifier transmitted by the signal emitting device 10 and direct the passenger-participant to a location provided by the location data transmitted by the signal emitting device 10, using compass direction, or an indoor navigation system.

In one embodiment, the signal emitting device 10 includes a beacon, or beacon-like device configured to send a signal. In yet another embodiment, the signal emitting device 10 comprises an electronic device, such as a smart phone or computer tablet, through which a driver-participant utilizes the car transportation system 15. The signal 20 transmitted by the signal emitting device 10 includes high frequency radio waves transmitting at a transmitter power output (TPO), or Tx power, ranging from 4-8 decibel-milliwatts (dBm), which translates to a signal range of 50-90 meters, such that the signal 20 transmitted by the signal emitting device 10 may reach longer distances when informing the passenger-participant of the signal emitting device's 10 location. The signal emitting device 10 is configured to continuously transmit the signal 20 over intervals ranging from ten times per second (i.e., one time per every 100 milliseconds) to one time per second, such that the signal emitting device 10 is continuously pulsating a signal, thereby facilitating the reception/location of the signal 20 by the passenger-participant.

The signal emitting device 10 is configured to be positioned in or on the driver-participant's vehicle, thereby transmitting the signal 20 directly from the driver-participant's vehicle. In this way, the signal emitting device 10 is in signal range when transmitting the signal 20 to a passenger-participant. The signal emitting device 10 is independent of any telecommunications, mobile, or internet network, such that the signal emitting device 10 can transmit the signal 20 when there is poor network service and/or no internet connection.

The signal emitting device 10 includes a wireless transmitter 40 for transmitting the signal 20, a wireless receiver 42 in communication with the car transportation system 15, a memory 45 configured to store location data, a logic 50 stored on the memory 45, and a processor 52 in communication with the memory 45 and configured to execute the logic 50. The logic 50 is configured to retrieve location data from the car transportation system 15, such as coordinates, obtained by a global positioning system of the car transportation system 15, and store it on the memory 45. When a signal 20 is transmitted by the signal emitting device 10, the logic 50 is configured to cause the signal 20 to transmit the retrieved location data along with it, thereby sending a driver-participant's exact location. The unique identifier of the signal 20 includes a number that is unique to and/or corresponds to the driver-participant of the car transportation system 15, such that the number identifies the signal emitting device 10 with the driver-participant.

Figure 2:
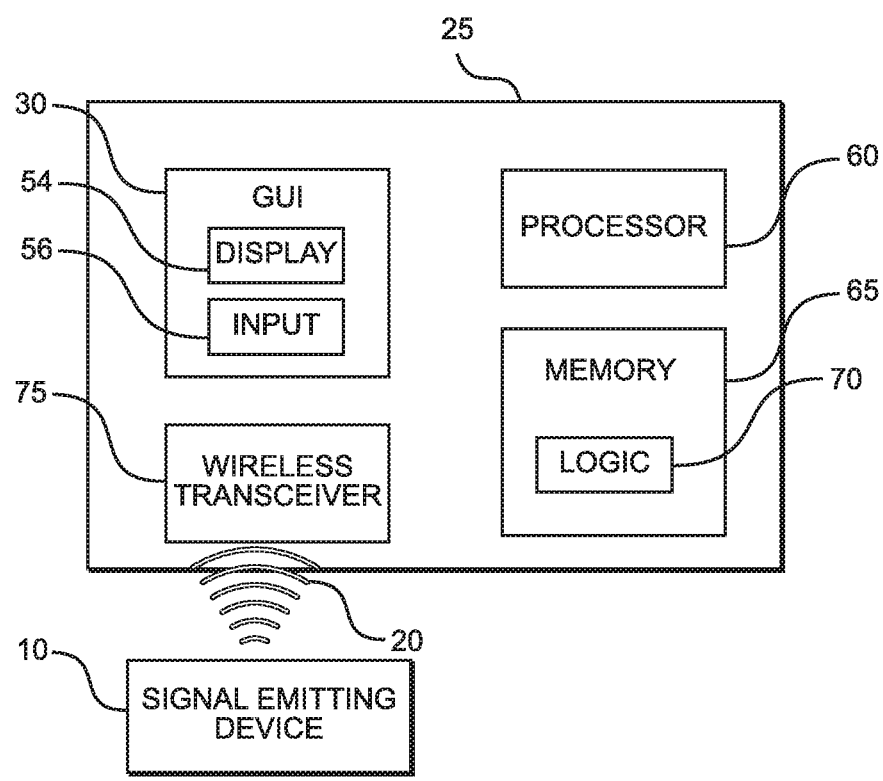
FIG. 2 shows a block diagram of an electronic device of a passenger-participant communicating with a signal emitting device of a driver-participant according to one embodiment of the present invention.

Referring now to FIG. 2, there is shown a block diagram of an electronic device of a passenger-participant communicating with a signal emitting device of a driver-participant according to one embodiment of the present invention. The electronic device 25 includes a graphic user interface (GUI) 30 having a display 54 and an input 56 for manipulating the GUI 30, a processor 60, a memory 65 in communication with the processor 60, a logic 70 stored on the memory 65 and configured to be executed by the processer 60, and a wireless transceiver 75 configured to receive the signal 20 of the signal emitting device 10.

Figure 3:
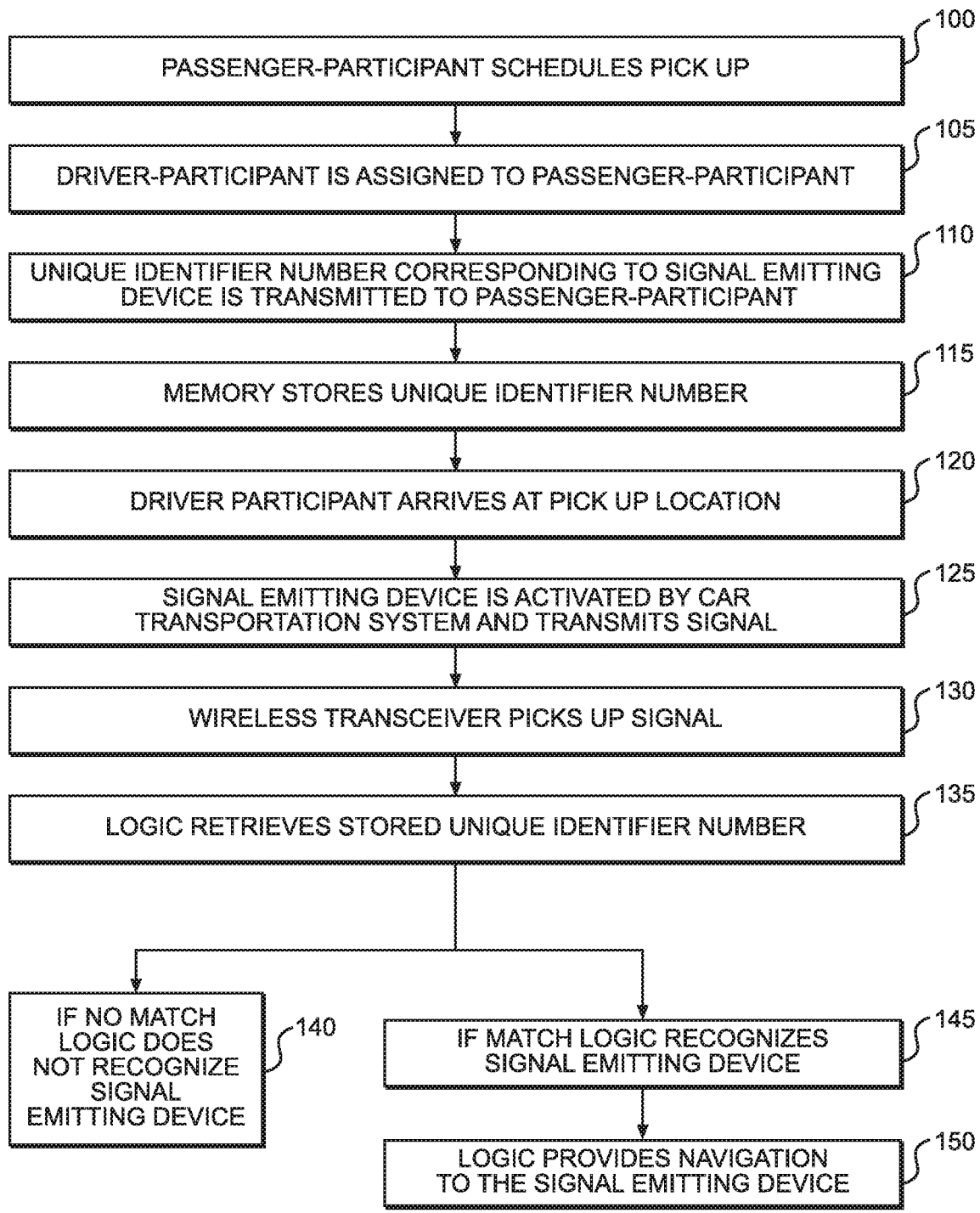
FIG. 3 shows a flow chart by which the system operates to facilitate location of driver-participants of car transportation systems according to one embodiment of the present invention.

Referring now to FIG. 3, there is shown a flow chart of the process by which the system operates to facilitate location of driver-participants of car transportation systems according to one embodiment of the present invention. When a passenger-participant requests a ride or schedules a pick-up, the car transportation system assigns a driver-participant to pick up the passenger-participant at a requested pick-up location, as shown by step 100. When the car transportation system assigns a driver-participant to a passenger-participant, the car transportations system is configured to transmit the number corresponding to the unique identifier of the driver-participant's signal emitting device to the passenger-participant, as shown by steps 105 and 110. In one embodiment, the logic of the signal emitting device is configured to transmit the number corresponding to the unique identifier thereof to the passenger-participant.

Upon reception of the unique identifying number, the processor stores the number on the memory of the passenger-participant's electronic device, as shown by step 115. When a driver-participant has arrived at the pick-up location, the car transportation system activates the signal emitting device and transmits a signal, as shown by steps 120 and 125. In one embodiment, the signal emitting device is configured to be manually activated by the driver-participant. The wireless transceiver picks up the signal from the signal emitting device, which includes the unique identifying number, as shown by step 130. The logic is then configured to retrieve the unique identifying number provided by the car transportation system from the memory and match the unique identifying number with the unique identifier of the signal, as shown by step 135. If there is no match, the logic does not recognize the signal emitting device, as shown by step 140. If there is a match, the logic recognizes the signal emitting device, as shown by step 145. Once the signal emitting device is recognized, the logic generates directions to the signal emitting device based on the location data accompanying the signal of the signal emitting device, as shown by step 150. In one embodiment, the turn-by-turn directions are displayed by the GUI of the electronic device.

Figure 4:
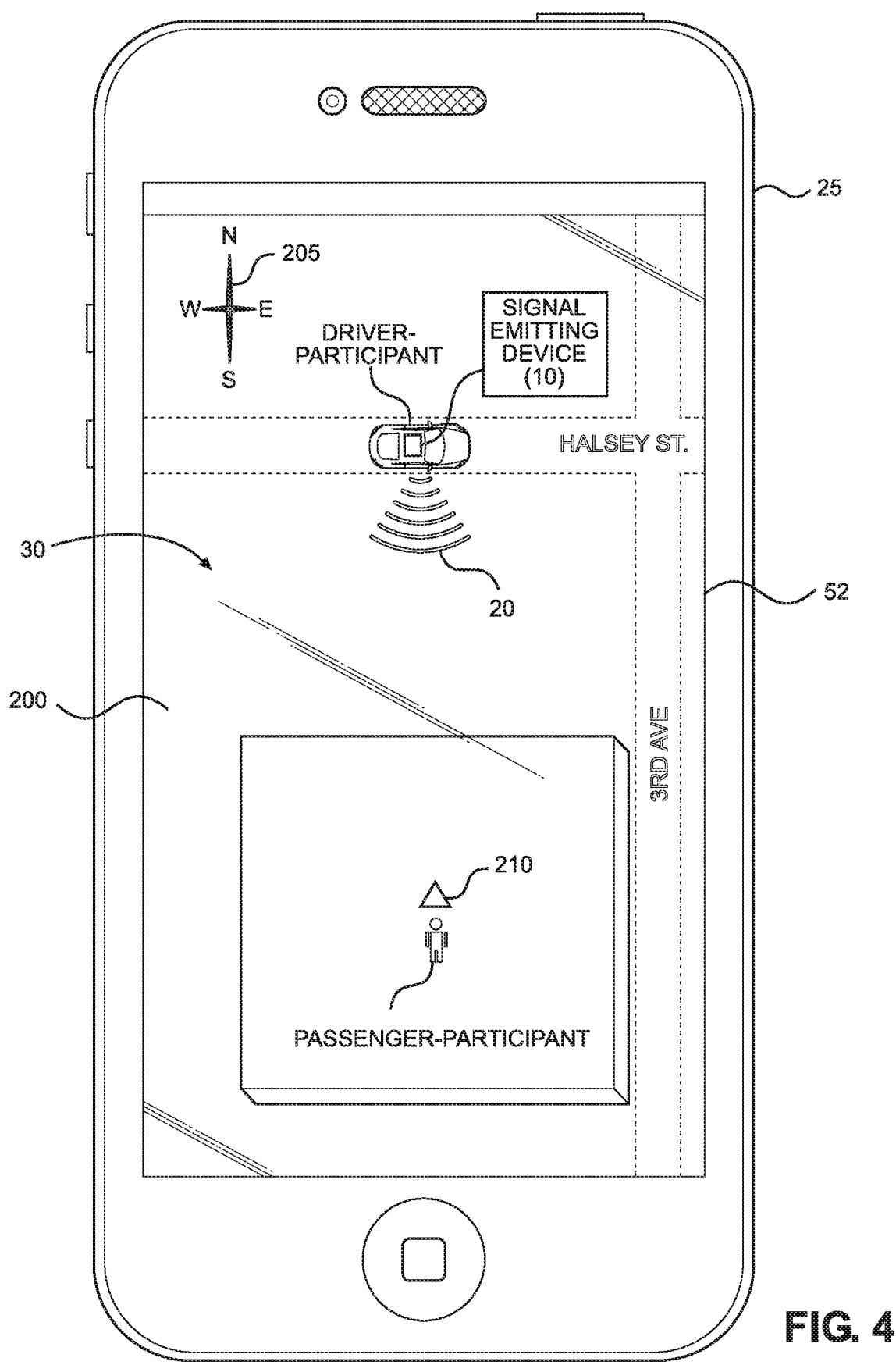
FIG. 4 shows a diagram of the electronic device's navigation platform for providing compass navigation to the signal emitting device according to one embodiment of the present invention

Referring now to FIG. 4, there is shown a diagram of the electronic device's navigation platform for providing compass navigation to the signal emitting device according to one embodiment of the present invention. The logic of the electronic device 25 is configured to provide a navigational path to the location provided by the signal 20 of the signal emitting device 10 via compass navigation. The graphic user interface 30 includes a navigation platform configured to display a map 200 and a compass 205 on the display 52 thereof. The logic is configured to pinpoint and display the location of the signal emitting device 10 and the passenger-participant on the map 200. The navigation platform includes the location of the passenger-participant with a directional arrow 210 coupled to the compass 205, such that the directional arrow 210 always points north. Using the compass 205 and directional arrow 210 a user may navigate a path towards the signal emitting device 10 and driver-participant's vehicle.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for facilitating location of driver-participants of car transportations systems, comprising:
   a signal emitting device in communication with a car transportation system, the signal emitting device configured to transmit a radio signal to an electronic device, the radio signal including a unique identifier for identifying the signal emitting device;
   a first processor;
   a first memory in operative communication with the first processor;
   a first logic stored on the first memory, that when executed by the processer, causes the system to perform a first method, the first method comprising the steps of:
      transmitting a number corresponding to the unique identifier to the electronic device;
      retrieving location data of the signal emitting device;
      transmitting the location data of the signal emitting device to the electronic device;
   the electronic device in communication with a car transportation system, the electronic device including a graphic user interface and a wireless transceiver configured to receive the transmitted radio signal;
   a second processor;
   a second memory in operative communication with the second processor;
   a second logic stored on the second memory, that when executed by the second processor, causes the system to perform a second method, the second method comprising the steps of:
      storing the number corresponding to the unique identifier in the second memory;
      retrieving the number from the second memory upon the wireless transceiver receiving the radio signal from the signal emitting device;
      comparing the retrieved number to the unique identifier transmitted with the received radio signal;
      determining a match;
      recognizing the signal emitting device and ascertaining the location of the signal emitting device based on the location data transmitted therewith.

2. The system of claim 1, further comprising:
   a driver-participant of the car transportation system;
   a passenger-participant of the car transportation system;
   wherein the signal emitting device corresponds to a vehicle of the driver-participant, the signal emitting device including the first processor, the first memory, and the first logic;
   wherein the electronic device corresponds to the passenger-participant, the electronic device including the second processor, the second memory, and the second logic.

3. The system of claim 2, wherein the signal emitting device includes an electronic device through which the driver-participant utilizes the car transportation system.

4. The system of claim 1, wherein the signal emitting device is independent of a network or internet connection, such that the signal emitting device is configured to transmit the radio signal absent a network or internet connection.

5. The system of claim 1, wherein the signal emitting device comprises a beacon.

6. The system of claim 1, wherein the signal transmitted by the signal emitting device includes high frequency radio waves transmitting at a transmit power ranging from 4-8 decibel-milliwatts (dBm).

7. The system of claim 6, wherein the radio signal is configured to have a signal range of 50-90 meters.

8. The system of claim 1, wherein the signal is transmitted over an interval ranging from between ten times per second and one time per second.

9. The system of claim 1, wherein the signal emitting device includes a wireless transmitter for transmitting the signal and a wireless receiver in communication with the car transportation system.

10. The system of claim 1, wherein the graphic user interface includes an input for controlling and manipulating the graphic user interface.

11. The system of claim 1, wherein the graphic user interface includes a display, a map, and a compass;
wherein the second method further comprises the steps of:
displaying the location of the signal emitting device and the location of the electronic device on the map; and
providing navigation directions towards the signal emitting device via the graphic user interface.

* * * * *